United States Patent [19]

Evangelou

[11] Patent Number: 5,494,703
[45] Date of Patent: Feb. 27, 1996

[54] OXIDATION PROOF SILICATE SURFACE COATING ON IRON SULFIDES

[75] Inventor: V. P. Evangelou, Lexington, Ky.

[73] Assignee: University of Kentucky Research Foundation, Lexington, Ky.

[21] Appl. No.: 346,124

[22] Filed: Nov. 29, 1994

[51] Int. Cl.$^6$ ........................................... B05D 7/00
[52] U.S. Cl. .................... 427/212; 427/215; 427/136; 427/399
[58] Field of Search .................. 427/212, 215, 427/399, 136

[56] References Cited

U.S. PATENT DOCUMENTS

| | | | |
|---|---|---|---|
| 4,155,716 | 5/1979 | Sun et al. ................................ | 44/1 R |
| 4,174,953 | 11/1979 | Sun et al. ................................ | 44/1 R |
| 4,249,910 | 2/1981 | Masologites et al. .................. | 44/24 |
| 4,320,923 | 3/1982 | Lawes et al. ............................ | 299/5 |
| 4,448,584 | 5/1984 | Masologites et al. .................. | 44/24 |
| 4,702,824 | 10/1987 | Abadi ..................................... | 209/167 |
| 4,787,918 | 11/1988 | Ho ........................................... | 44/624 |
| 5,234,712 | 8/1993 | Howard .................................. | 427/215 |
| 5,286,522 | 2/1994 | Evangelou et al. .................... | 427/212 |

OTHER PUBLICATIONS

Charmbury, H. Beecher; Environment—Water; Elements of Practical Coal Mining, 2d Edition; pp. 669–672; 1981.

Primary Examiner—Shrive Beck
Assistant Examiner—David M. Maiorana
Attorney, Agent, or Firm—King and Schickli

[57] ABSTRACT

The present method induces an oxidation-proof ferric silicate coating on iron sulfide such as pyrite and marcasite. The method includes the steps of placing the pyrite to be treated in a reaction vessel and leaching the pyrite with a coating composition including water, an oxidizing agent and a silicate coating agent. Examples of oxidizing agents include hydrogen peroxide, sodium hypochlorite, potassium hypochlorite and mixtures thereof. The silicate coating agent may be sodium metasilicate. In order to ensure the formation of the stable coating, the leaching is performed at a pH of 4–6 and more preferably 5. Additionally, the oxidizing agent is maintained at a concentration of substantially 0.6% by weight of the coating composition while the concentration of the silicate coating agent is maintained at at least substantially $1.8 \times 10^{-3}$ M/l.

21 Claims, 2 Drawing Sheets

OXIDATION PROOF SILICATE SURFACE COATING ON IRON SULFIDES

TECHNICAL FIELD

The present invention relates generally to the control of acid drainage and more particularly to a method for reducing or preventing the oxygen and water oxidation of iron sulfide waste products of the mining and ore purification industries and the resulting production of acid solutions enriched with heavy metals that pollute the environment.

BACKGROUND OF THE INVENTION

In recent years, the public, industry and government at all levels have become acutely aware of the need to manage the nations's water resources more efficiently. Further, society is now demanding that cleaner streams, rivers and lakes be provided free from pollutants that might interfere with the best use of these resources. Accordingly, many new laws have been passed that prohibit the discharge of water into streams unless or until it is free from certain pollutants. As a result mine water or mine drainage is one of the more serious environmental problems facing the coal industry today. This is particularly true as it relates to long established underground operations (Crickmer, Douglas F., Zegeer, David A., *Elements of Practical Coal Mining*, The Society of Mining Engineers of the American Institute of Mining, Metallurgical and Petroleum Engineers, Inc., New York, NY, 1981, pp. 669–672).

More specifically, mining operations for coal and various ores involve the in situ exposure of pyrite and marcasite containing geologic strata to the atmosphere. These iron sulfide compounds undergo oxidation upon contact with the oxygen and water that is plentiful in the environment. This oxidation produces highly acid water enriched with various heavy metals.

In addition to pyrite and marcasite present in the geologic strata, pyrite and marcasite is often a component of the mined ore product. Upon further treatment of the ore for product purification purposes this additional pyrite and marcasite is separated and treated as a waste product. This waste product is subject to oxidation as described above and consequently also produces acid solutions enriched with heavy metals. As already indicated, both the acid solutions and heavy metals are now recognized as very significant environmental pollutants that must be controlled. Up until the development of the present invention, however, there has been no reliable, long term, economic technique to reduce or prevent the oxidation of the pyrite and marcasite.

In the past, there have been four main approaches utilized to treat pyrite/marcasite rich material in order to control oxidation. In the first approach, neutralizing agents are utilized to treat acid drainage produced from the oxidation. Unfortunately, this approach only treats the symptoms of the oxidation and simply does not address the cause. Further, the approach is very costly. Additionally, it only represents a short term solution as it is not feasible to periodically return to the site to retreat the drainage over an extended period of time.

The second approach involves the utilization of detergents to kill sulfur oxidizing bacteria. Unfortunately, this approach is also only a relatively short term solution lasting from six months to a year. Further, it is also only suited to certain field conditions and thus has limited applications. Still further, utilization of some of the detergents also effects the environment adversely and accordingly, the impact of this procedure must be closely monitored.

The third approach is physical encapsulation of the pyrite/marcasite containing waste products. More particularly, clay liners, plastic liners and blacktop liners may be utilized to prevent oxygen and water from reaching the pyrite and marcasite. Unfortunately, this approach is very expensive. Additionally, the liners are subject to cracking and the cost to repair cracked liners is prohibitive. Accordingly, this approach is rarely used by mine operators.

The fourth approach is disclosed in U.S. Pat. No. 5,286,522 to Evangelou et al. This patent describes a method of providing an oxidation proof coating of phosphate on the iron sulfide. While this approach is more economical and has greater long term effect than the other three prior art approaches just described, it is not without its drawbacks and limitations.

First, phosphate is known to be a primary cause of eutrophication in streams and particularly ponds and lakes. Thus, the use of phosphate in this method causes its own environmental impact and concerns. Second, the phosphate coating on the iron sulfide has been found to be stable only at higher pH's. Unfortunately, lower pH's such as those in the range of pH 2.5–4.0 that are prevalent in mining locations and spoil areas lead to a breakdown of the phosphate coating within about fifty days. Accordingly, unless the mining location and spoil area are periodically (e.g. every thirty days) treated with limestone or other alkaline material to control pH and maintain the pH level between pH 6–8 the coating degrades exposing the iron sulfide to oxidation. This, of course, leads to the gradual development of the acid solutions enriched with heavy metals that it is hoped to avoid.

Thus, disadvantageously, it should be appreciated that the "solution" to the problem of iron sulfide oxidation presented in U.S. Pat. No. 5,286,522 unfortunately requires continuous periodic monitoring and maintaining of a desired pH by application of alkaline material. This is an inconvenient, expensive and daunting task over time that which limits the feasibility and application of this proposed approach.

Following review of this background to the pyrite and marcasite oxidation problem, it should be appreciated that a need exists for a better solution. Further, the need is great. So as to have a better understanding of the extent of the problem, an average coal processing plant produces anywhere from 1 to 5 tons of finely ground pyrite per hour. Thus, this is a very significant environmental problem.

SUMMARY OF THE INVENTION

Accordingly, it is a primary object of the present invention to provide a method for treating iron sulfide containing material in order to control oxidation and the production of acid solutions enriched with heavy metals overcoming the above-described limitations and disadvantages of the prior art.

Another object of the present invention is to provide a method of inducing an oxidation-proof silicate surface coating on iron sulfides including pyrite and marcasite wherein the coating is stable and long lasting even in the presence of an acid environment thereby significantly reducing or eliminating this environmental problem.

Yet another object of the preset invention is to provide a relatively economical and efficient method for treating mine tailings and waste products from ore purification processes so as to reduce or substantially eliminate the oxidation of iron sulfides such as pyrite and marcasite contained in those waste products.

Advantageously, as the resulting silicate coating is stable and long lasting, these waste products may then be safely disposed of in the environment without the need for expensive physical encapsulation processes including the construction of clay, plastic or blacktop liners. This is because the silicate coating substantially prevents the contact of oxygen and water with the pyrite/marcasite. Thus, the production of acid solutions enriched with heavy metals from oxidation of iron sulfides is substantially eliminated.

Still another object of the invention is to provide a method of coating iron sulfides such as pyrite and marcasite in situ to minimize environmental damage from oxidation and reduce the chances of spontaneous combustion of coal reserves resulting from heat produced during flamboidal pyrite oxidation. Advantageously, the silicate coating produced by the present method is acid resistant and can withstand pH's as low as pH 2.5–4.0: that is, pH ranges prevalent in soils around mining sites and spoil areas. Thus, it should be appreciated that the silicate coating on the iron sulfide is stable and prevents oxidation over time without the need to monitor, adjust and maintain a neutral pH in these areas. As such, the present method presents the first economically feasible, long term solution to the problem of iron sulfide oxidation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a method of inducing an oxidation-proof silicate coating on iron sulfide materials such as pyrite and marcasite is provided. In accordance with the broader aspects of the present invention, the method includes the step of placing the iron sulfide containing material to be treated in a reaction vessel. Next is the step of leaching the material with a coating composition or solution including water, an oxidizing agent and a silicate coating agent. This coating composition is preferably buffered to a pH between substantially 4–6.

Advantageously, the silicate coating composition is active even at ambient temperatures in the range of 20°–25° C. Thus, the process may be performed in situ if desired. So long as the pH range of pH 4–6 is maintained, it is possible to establish an actual silicate coating on the pyrite and marcasite.

More specifically, the oxidizing agent may be selected from a group of compounds including hydrogen peroxide ($H_2O_2$), sodium hypochlorite (NaClO), potassium hypochlorite (KClO), and mixtures thereof. Further, the coating composition includes substantially 0.6% by weight oxidizing agent. The optimal concentration of oxidizing agent is related to the silicate concentration in the coating composition.

Preferably, the silicate coating agent is sodium metasilicate ($Na_2SiO_3.5H_2O$). It should be appreciated, however, that other water soluble silicate compounds may be utilized. Such silicate compounds are environmentally friendly. They are also a major chemical component of geologic soils and materials and, therefore are plentiful so as to be readily available and inexpensive. They do not cause eutrophication like phosphates and are not an environmental hazard. Accordingly, the present method is fully environmentally safe.

In order to ensure economical and efficient coating, the concentration of silicate in the coating composition should be maintained at at least substantially $1.8 \times 10^{-3}$ M/l. At this concentration, the silicate inhibits any dissolution of the coating that might otherwise take place as a result of the activity of the strong acid produced by the reaction between the oxidizing agent and exposed pyritic/marcositic surfaces during processing.

For more efficient processing, it is desirable to create a slurry of water and the iron sulfide containing material. This slurry is then placed in the reaction vessel. The reaction vessel is then filled from the bottom up with the coating composition at a flow rate of, for example, substantially 0.5 milliliters per minute per square centimeter of the bottom surface area of the reaction vessel. The leaching treatment continues for a period of time of from 30–60 minutes in order to provide the desired coating action. Of course, it should be appreciated that the coating composition may be recycled as all the silicate coating agent is not removed from the coating composition after a single pass through the reaction vessel. Preferably, when recycling the silicate coating agent concentration is brought back to at least $1.8 \times 10^{-3}$ M/l prior to returning to the reaction vessel.

As will be described in greater detail below, the present method serves to form a stable and durable coating over the iron sulfide materials including pyrite and marcasite contained in mine tailings and waste products from ore purification processes. This coating advantageously resists penetration by oxygen and water thereby preventing contact between the iron sulfide of the pyrite and marcasite and these oxidation agents.

In accordance with yet another aspect of the present invention, the coating is, advantageously acid resistant and stable down to pH's as low as pH 2.5– 4.0, the range of pH characteristic of soils at mining sites and in spoil areas. Accordingly, it should be appreciated that the coating is durable, providing long term protection against iron sulfide oxidation even without any additional soil treatment to control or raise soil pH to a neutral level. Hence, it is not necessary to mix the coated pyrite/marcasite with limestone prior to disposition in a landfill or to periodically reapply limestone as in prior art methods to protect the coating from acid attack. As a result of the present invention, a long lasting and reliable coating is provided that effectively allows iron sulfide materials such as pyrite and marcasite to be reintroduced into the environment while significantly reducing or substantially eliminating the potential adverse environmental effects that would otherwise be produced through oxidation: that is the production of acid solutions significantly enriched with heavy metals.

In accordance with still another aspect of the present invention, a silica coating is provided on iron sulfide including pyrite and marcasite in situ. Specifically, a coating composition of the type described including water, an oxidizing agent and a silicate coating agent is applied to the iron sulfide containing material. As a result, a silicate coating is produced that prevents oxidation, thereby reducing the adverse environmental effects that would otherwise occur.

Additionally, the coating process also reduces the risk of flamboidal pyrite oxidation induced fires. More specifically, it has been found that under certain conditions, oxidation of flamboidal pyrite produces sufficient heat to cause coal in adjacent strata to combust spontaneously. By reducing the risk of such a fire occurring, damage to the environment is further limited and coal reserves are saved.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing.

Figure 1:
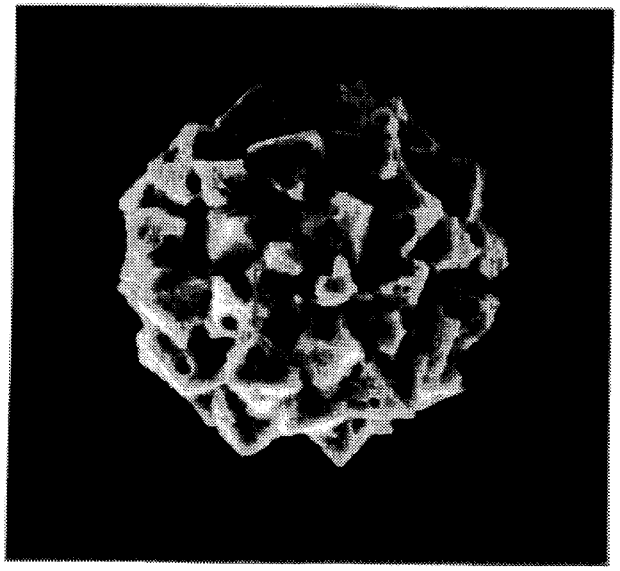
FIG. 1 is a scanning electron microscope black and white photograph of a framboidal pyrite particle with a silicate coating as a result of undergoing processing in accordance with the method of the present invention.

Reference will now be made in detail to the present preferred embodiment of the invention resulting in the silicate coating of iron sulfide as illustrated in the accompanying photographs.

DETAILED DESCRIPTION OF THE INVENTION

As indicated above, the present method induces an oxidation-proof silicate surface coating on iron sulfide materials such as pyrite and marcasite. Such iron sulfides may be found in earth strata, rocks, mine tailings, gob piles, waste products from ore purification processes and the like. Unfortunately, the safe environmental disposal of these materials is difficult as oxygen and water in the environment oxidize the iron sulfides and produce strong sulfuric acid solutions that are enriched with heavy metals. The present invention efficiently and effectively addresses this problem by providing a stable and long lasting coating over the pyrite and marcasite that prevents the oxidation reaction from occurring. Advantageously this desired result is achieved using inexpensive environmentally safe and friendly silicate starting materials. Further, the resulting silicate coating is stable in the acid environment characteristic of mining sites or spoil materials.

More specifically, the present invention involves leaching the iron sulfide containing material with a coating composition including water, an oxidizing agent and a silicate coating agent. When the coating composition comes into contact with the surface of the iron sulfide containing material under the defined conditions, the following reactions occur leading to the formation of a surface coating.

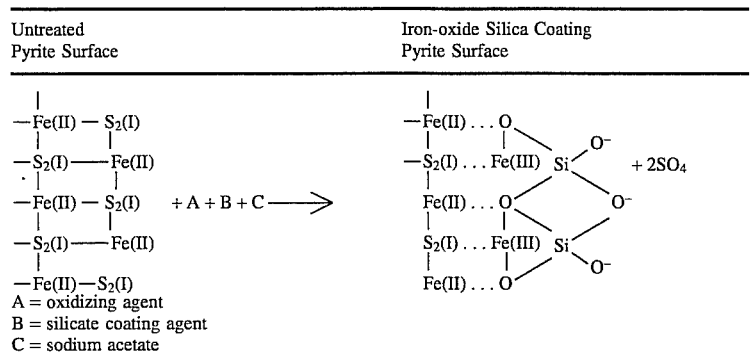

More specifically, the surface of the pyrite or marcasite upon exposure to an oxidizing agent such as hydrogen peroxide, sodium hypochlorite, potassium hypochlorite or mixtures thereof undergoes oxidation. Specifically, the Fe(II) oxidizes to Fe(III) and the sulfide ($S_2$) oxidizes to $SO_4^{-2}$. The latter is a soluble species. Advantageously, the iron (Fe(III)) reacts with the $SiO_3^{-2}$ provided by the silicate coating agent thereby adsorbing silicate on top of the ferric oxyhydroxide created by the oxidizing agent in the presence of the pH buffer at around pH 4–6 and preferably pH 5. This silicate coating prevents any further oxidation of the pyrite as shown in the above chemical equation, the dotted lines signifying physical bonding between the pyrite and the ferric silica coating.

More particularly describing the method, the iron sulfide containing material to be treated is mixed with an appropriate volume of water in order to form a slurry. The slurry is then pumped or placed in a reaction vessel of desired size. The vessel volume would depend upon the size of the operation but one of 30.0 ft³ capacity is feasible.

The reaction vessel is preferably fitted with mechanical agitators and a solution tight cover in the same manner as froth flotation apparatus known in the art. After the slurry is placed in the reaction vessel and the cover sealed, the agitator is activated and leaching of the iron sulfide materials, e.g., pyrite and marcasite, is initiated with a coating composition including water, an oxidizing agent and a silicate coating agent. Preferably, the oxidizing agent is selected from a group of compounds including hydrogen peroxide, sodium hypochlorite, potassium hypochlorite, and mixtures thereof. The silicate coating agent is preferably sodium metasilicate. It should be recognized, however, that other soluble silicate compounds may be used including but not limited to fly ash containing dissolved silica.

In order to ensure the formation of a ferric silicate coating on the pyrite/marcasite, reaction conditions must be strictly maintained. In particular, the coating composition is preferably buffered to a pH between substantially 5–7. A number of known buffering agents may be utilized for this purpose including, for example, sodium acetate ($C_2H_3NaO_2$). Specifically, the pH must be maintained between substantially pH 4–6 and preferably at pH 5 in order to induce formation of an iron silicate coating. Too high a pH, however, causes hydroxyl groups to become competitive in the reaction. This leads to the formation of iron hydroxide rather than the desired silicate coating. Hence at a pH above substantially 7, a hydroxyl iron silicate coating results that is more soluble and less resistant to acid attacked and thus, less desirable.

In addition, the amount of the oxidizing agent is also maintained at a specific level of substantially 0.6% by weight of the coating composition. The actual concentration of the oxidizing agent is varied with the silicate concentration of the coating composition as presented in the slurry. For example, for $10^{-2}$ M $Na_2SiO_3$, optimal $H_2O_2$ concentrations range from 0.09–0.21 M. Further, it is important to maintain the concentration of the silicate in the silicate coating composition and slurry in the reaction vessel at a level of at least $1.8 \times 10^{-3}$ M/l during leaching. This is necessary to insure that the coating does not collapse from dissolution of the $FeSiO_3$ by the strong acid produced during the initial stages of the process as a result of oxidation of exposed pyritic surfaces by the oxidizing agent.

Advantageously, by maintaining all these parameters, a ferric silicate coating is formed on the pyrite/marcasite to thereby provide long lasting protection against oxidation upon return of the pyrite/marcasite to the environment.

In order to ensure that all of the pyrite/marcasite in the reaction vessel is completely coated, it is desirable to pump the coating composition into the reaction vessel from the bottom so that it flows up through the vessel and out a return conduit. Preferably, a flow rate of, for example, substantially 0.5 milliliters per minute per square centimeter of the bottom surface area of the bottom reaction vessel is used. Of course, as all of the silicate coating agent is not utilized in creating a coating as it cycles through the vessel, the coating composition is preferably recycled. During recycling, the composition is monitored and oxidizing agent and silicate coating agent may be added as required to maintain the necessary concentration levels before returning to the reaction vessel. It has been found that by performing the leaching operation as described for a period of 30 to 60 minutes, all the pyrite may be reliably coated with the stable ferric silicate coating.

After coating the pyrite/marcasite with ferric silicate in the manner described, environmentally acceptable disposal of this waste product is made possible. Specifically, for as long as the coating remains sound and it does so even in the acid environment characteristic of mining sites and spoil materials, oxidation of the pyrite/marcasite by atmospheric oxygen and water is substantially prevented. As a result, the acid drainage and heavy metal pollution problems are virtually eliminated.

Of course, it should be appreciated that iron sulfide containing materials such as pyrite and marcasite may also be coated by the present method in situ. More specifically, this is done by applying to the pyrite/marcasite containing strata an effective amount of the coating composition described including water, an oxidizing agent and a silicate coating agent. The coating reaction readily occurs at ambient temperatures between 20°–25° C. and any runoff of coating composition may be collected in a run off pond and recycled.

Advantageously, the resulting coating of the pyrite/marcasite in situ reduces or prevents the oxidation process from occurring thereby reducing or preventing the production of acid solutions enriched with heavy metals. Additionally, the oxidation of flamboidal pyrite has been known to produce sufficient heat to cause coal to combust spontaneously. The risk of this very significant problem occurring is substantially reduced utilizing the present method.

The following example is presented to further illustrate the invention, but it is not to be considered as limited thereto.

EXAMPLE 50 mg of 100 mesh pure pyrite (coal shale pyrite) was mixed with 450 mg of sand previously passed through a 140 mesh sieve. After thorough mixing, the mixture was placed into a reaction vessel or column having a 1 cm inside diameter. After placement in the column the mixture was pressed into a disc. The column was then leached with 500 ml of a solution containing 0.145 M hydrogen peroxide and 40– 50 mgL$^{-1}$ silica (Si) having as a source sodium meta silicate ($Na_2SiO_3 \cdot 5H_2O$) using a pump at a flow rate of 0.5 milliliters per minute. The coating solution was also buffered with sodium acetate to pH 5 with the reaction occurring at room temperature (e.g. between 20°–25°).

Figure 2:
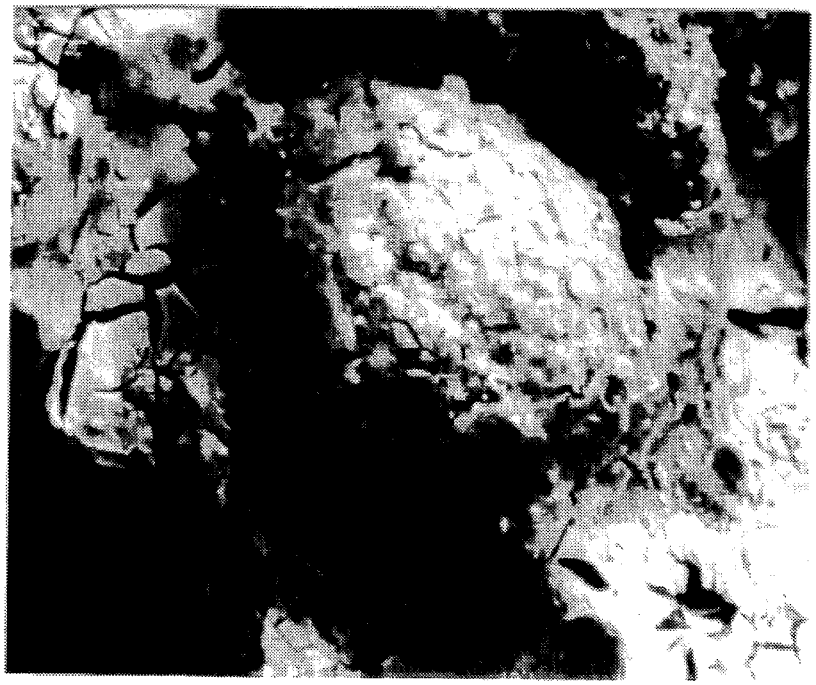
FIG. 2 is a scanning electron microscope black and white photograph showing the morphology of a framboidal pyrite particle prior to undergoing processing in accordance with the present method and therefore not including the silicate coating shown in FIG. 1.

Physical evidence of the formation of a ferric silicate coating on the pyrite is presented in the electron microscope photos shown in FIGS. 1 and 2. FIG. 1 shows the surface appearance of the coated pyrite while FIG. 2 shows the surface appearance of the uncoated pyrite.

In order to demonstrate that the silicate coating of the present invention is resistant to low pH values or even strong acid attack the following experiment was carried out. First, framboidal pyrite was coated with the present silicate coating. This coated pyrite was then oxidized with 0.145 mol L$^{-1}$ $H_2O_2$ at room temperature. This is demonstrated in FIG. 3. The data from zero to 900 minutes represent the silicate coating process of pyrite. After 900 minutes, the data labeled A represent leaching of silicate coated pyrite with oxygenated water alone. No pyrite oxidation is apparent. The data labeled B represent coated pyrite oxidation with 0.145 mol L$^{-1}$ $H_2O_2$, a strong pyrite oxidizer. These data show that the silicate coating protected pyrite from oxidizing by inhibiting $H_2O_2$ diffusion to the pyrite surface.

Figure 3:
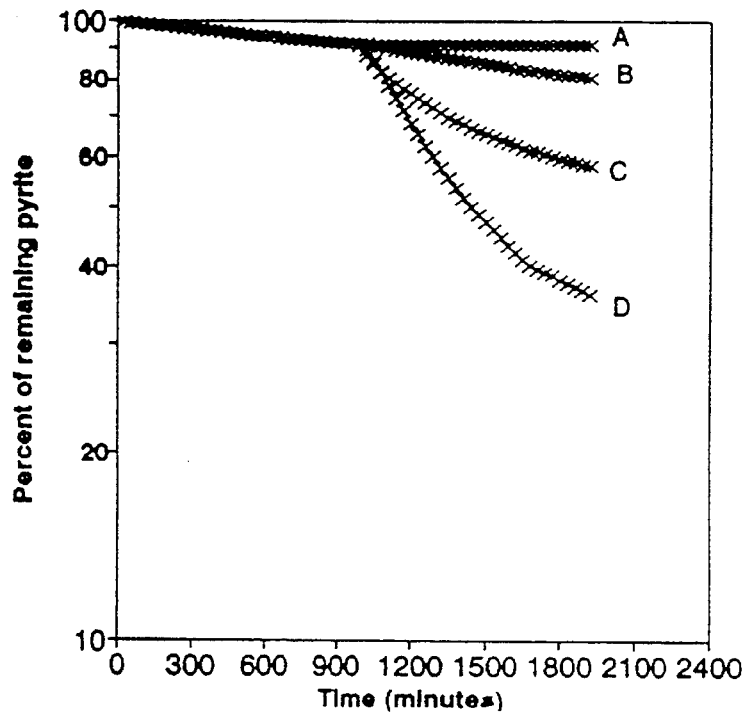
FIG. 3 is a graphical representation showing the relative oxidation potential of flamboidal pyrite in the absence or presence of a silicate coating.

In order to demonstrate that the coating on the surface of the pyrite was acid resistant because it was composed of two distinct layers, an iron-oxide layer (acid sensitive) and a silicon oxide (silica) layer (acid resistant), a pyrite sample coated in accordance with the present method was leached with 50 ml 4 mol L$^{-1}$ hydrochloric acid to remove the iron from the pyrite silicate coating leaving behind the silicate coating by itself. After removal of the iron-oxyhydroxide, the pyrite sample was oxidized with 0 145 mol L$^{-1}$ H$^2$O$_2$. The purpose of this treatment was to remove the iron-oxyhydroxide coating as well as the silicate coating (HF specifically decomposes silica; HF is not present in acid drainages emanating from pyritic waste). After removal of the iron-oxyhydroxide-silicate coating, the pyrite sample was oxidized with 0.145 mol $L^{-1}$ $H_2O_2$. The purpose of these two treatments (HCl versus HF) was to demonstrate that silicate coating on the surface of pyrite was produced and that this coating was resistant to acid attack. The results are shown in FIG. 3 at lines C and D respectively. The data presented by line C (representing 4 mol $L^{-1}$ HCl treatment) show that oxidation of pyrite by 0.145 mol $L^{-1}$ $H_2O_2$ was greatly suppressed relative to that treated with 4 mol $L^{-1}$ HF line D. This strongly suggests that the silicate part of the coating offers substantial protection to pyrite from $H_2O_2$ (a very strong oxidizer) attack due to the fact that silicate is not soluble in acid. No other mineral pyrite coating offers such pyrite protection. For example, pyrite ferric-phosphate coating is soluble at the below pH 3.

Figure 4:
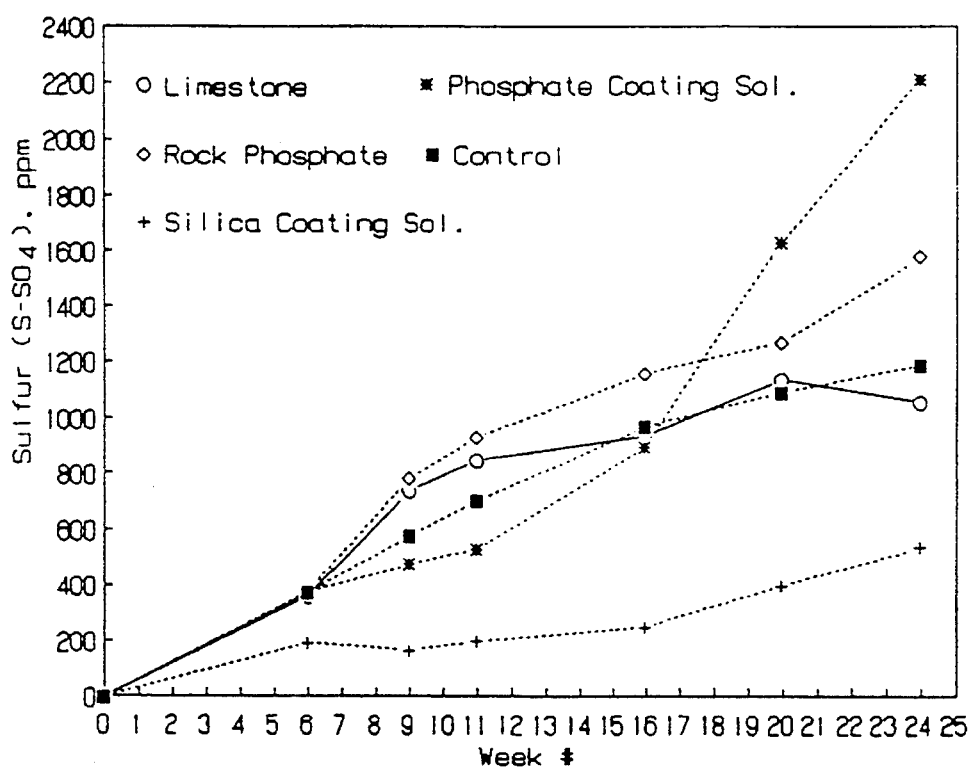
FIG. 4 is a graphical representation demonstrating the relative long-term effectiveness of the present invention in controlling iron sulfide oxidation as compared with various prior art approaches including mixing with limestone, mixing with rock phosphate and coating with phosphate as described in U.S. Pat. No 5,286,522.

The data in FIG. 4 demonstrates the long-term effectiveness of the present process or method in controlling metal sulfide oxidation. These tests involved pyritic mine waste samples as well as pyrite mine waste samples. Pyrite coated in accordance with the present method is compared with pyrite treated with limestone, rock phosphate, phosphate coating per U.S. Pat. No. 5,286,522 and untreated pyrite. The data clearly show that the silicate coating of the present method was the most effective treatment in controlling pyrite oxidation.

In summary, numerous benefits result from employing the concepts of the present invention. More particularly, an economical and effective method for preventing oxidation of iron sulfides including pyrite and marcasite, as a result of reaction with oxygen and water in the environment is provided. As a result, these compounds may be disposed of in a more environmentally safe manner. In particular, a strong and stable ferric silica coating is provided on the pyrite/marcasite. This coating shields the pyrite/marcasite from contact with the oxidizing agents in the environment that would otherwise lead to the formation of acid solutions enriched with heavy metals. As a result of the present method, a very significant cause of environmental problems has been addressed in a more effective manner than possible in prior art approaches. Accordingly, the present invention represents a significant advance in the art of controlling this type of environmental pollution.

I claim:

1. A method of inducing an oxidation proof silicate surface coating on iron sulfide containing materials including pyrite and marcasite, comprising the steps of:

placing the iron sulfide containing materials in a reaction vessel;

leaching the iron sulfide containing materials with a coating composition including water, an oxidizing agent and a silicate coating agent buffered to a pH of between substantially 4–6.

2. The method set forth in claim 1, wherein said silicate coating agent is selected from a group consisting of alkali metal silicates, alkaline earth metal silicates and mixtures thereof.

3. The method set forth in claim 1, wherein said silicate coating agent is sodium metasilicate.

4. The method set forth in claim 1 including first forming a slurry with said iron sulfide containing materials prior to placing into said reaction vessel.

5. The method set forth in claim 1, including selecting said oxidizing agents from a group consisting of hydrogen peroxide, sodium hypochlorite, potassium hypochlorite and mixtures thereof.

6. The method set forth in claim 5, including providing said silicate coating composition with substantially 0.6% by weight oxidizing agent.

7. The method set forth in claim 1, including providing said silicate coating composition with substantially 0.6% by weight oxidizing agent.

8. The method set forth in claim 2, including maintaining silicate in said coating composition at a concentration of at least substantially $1.8\times10^{-3}$ M/l.

9. The method set forth in claim 1, including pumping said coating composition into the reaction vessel from the bottom up at a flow rate of substantially 0.5 milliliters per minute per square centimeter of the bottom surface area of said reaction vessel.

10. The method set forth in claim 1, including continuing to leach said iron sulfide containing materials for a period of time of from 30 to 60 minutes.

11. The method set forth in claim 1, including recycling said coating composition and bringing said silicate coating agent concentration back to at least $1.8\times10^{-3}$ M/l prior to returning to said reaction vessel.

12. A method of inducing an oxidation proof silicate surface coating on iron sulfide containing materials including pyrite and marcasite, comprising the steps of:

placing the iron sulfide containing materials in a reaction vessel;

leaching the iron sulfide containing materials with a silicate coating composition including water, substantially 0.6% by weight oxidizing agent selected from a group consisting of hydrogen peroxide, sodium hypochlorite, potassium hypochlorite and mixtures thereof and a soluble silicate coating agent buffered to a pH of substantially 4–6; and maintaining the concentration of silicate in said silicate coating composition at a level of at least $1.8\times10^{-3}$ M/l during leaching whereby a silicate coating is formed on said iron sulfide containing materials.

13. The method set forth in claim 12, including first forming a slurry with said iron sulfide containing materials prior to placing into said reaction vessel.

14. The method set forth in claim 13, including pumping said coating composition into the reaction vessel from the bottom up at a flow rate of substantially 0.5 milliliters per minute per square centimeter of the bottom surface area of said reaction vessel.

15. The method set forth in claim 12, including pumping said coating composition into the reaction vessel from the bottom up at a flow rate of substantially 0.5 milliliters per minute per square centimeter of the bottom surface area of said reaction vessel.

16. The method set forth in claim 15, including continuing to leach said iron sulfide containing materials for a period of time of from 30 to 60 minutes.

17. The method set forth in claim 12, including continuing to leach said iron sulfide containing materials for a period of time of from 30 to 60 minutes.

18. The method set forth in claim 16, including recycling said coating composition and bringing said silicate concentration back to at least $1.8\times10^{-3}$ M/l prior to returning to said reaction vessel.

19. The method set forth in claim 12, including recycling said coating composition and bringing said silicate concentration back to at least $1.8\times10^{-3}$ M/l prior to returning to said reaction vessel.

20. A method of providing a silicate coating on iron sulfide containing materials in situ, comprising the step of:

applying an effective amount of a silicate coating composition including water, an oxidizing agent and a silicate coating agent buffered to a pH of between substantially 4–6 to said iron sulfide containing material in situ.

21. The method set forth in claim 20 wherein said oxidizing agent is selected from a group consisting of hydrogen peroxide, sodium hypochlorite, potassium hypochlorite and mixtures thereof, said silicate coating agent is selected from a group consisting of alkali metal silicates, alkaline earth metal silicates and mixtures thereof and said application is completed at an ambient temperature of 20°–25° C.

* * * * *